(12) United States Patent
Shigeru et al.

(10) Patent No.: US 8,404,307 B2
(45) Date of Patent: Mar. 26, 2013

(54) HYDROPHILIC FILM, PROCESS FOR PRODUCING SAME, AND COATING MATERIAL FOR FORMING HYDROPHILIC FILM

(75) Inventors: Keijiro Shigeru, Funabashi (JP); Daisaku Maeda, Shiroi (JP)

(73) Assignee: Sumitomo Osaka Cement Co., Ltd. (JP)

( * ) Notice: Subject to any disclaimer, the term of this patent is extended or adjusted under 35 U.S.C. 154(b) by 229 days.

(21) Appl. No.: 12/405,428

(22) Filed: Mar. 17, 2009

(65) Prior Publication Data

US 2009/0176024 A1 Jul. 9, 2009

Related U.S. Application Data

(63) Continuation of application No. 10/508,583, filed as application No. PCT/JP03/03855 on Mar. 27, 2003, now abandoned.

(30) Foreign Application Priority Data

Mar. 27, 2002 (JP) ................................. 2002-089158
Nov. 5, 2002 (JP) ................................. 2002-321172

(51) Int. Cl.
   *B05D 3/10* (2006.01)
   *B05D 3/02* (2006.01)
(52) U.S. Cl. ........ 427/333; 427/337; 427/343; 427/344; 427/372.2; 427/397.7; 427/397.8
(58) Field of Classification Search .................. 427/333, 427/337, 343, 344, 372.2, 397.7, 397.8, 403, 427/419.3
See application file for complete search history.

(56) References Cited

U.S. PATENT DOCUMENTS

| | | | |
|---|---|---|---|
| 2,346,322 A | | 4/1944 | Nelson et al. |
| 3,615,780 A | * | 10/1971 | Kim et al. .................... 106/608 |
| 4,530,722 A | * | 7/1985 | Moore et al. ................ 106/38.35 |
| 4,957,159 A | * | 9/1990 | Mizoguchi et al. .......... 165/133 |
| 5,059,492 A | | 10/1991 | Shindon et al. |
| 5,527,836 A | | 6/1996 | Yamamuro et al. |
| 6,071,606 A | | 6/2000 | Yamazaki et al. |
| 6,582,839 B1 | | 6/2003 | Yamamoto et al. |
| 6,783,828 B2 | | 8/2004 | Fujimaru et al. |
| 6,787,584 B2 | | 9/2004 | Jia et al. |
| 2003/0013043 A1 | * | 1/2003 | Inno et al. .................... 430/302 |

FOREIGN PATENT DOCUMENTS

| | | |
|---|---|---|
| EP | 0 287 877 | 10/1988 |
| EP | 1 069 074 | 1/2001 |
| EP | 1 081 108 A1 | 3/2001 |
| JP | 61021989 A * | 1/1986 |
| JP | 01234795 A * | 9/1989 |
| JP | 6-271370 | 9/1994 |
| JP | 9-328336 | 12/1997 |
| JP | 2000-191960 | 7/2000 |
| JP | 2000-192021 | 7/2000 |
| JP | 2000-297231 | 10/2000 |
| JP | 2001-180980 | 7/2001 |
| JP | 2001-240773 | 9/2001 |
| JP | 2001-247791 | 9/2001 |
| JP | 2002-80830 | 3/2002 |
| JP | 2002080830 A * | 3/2002 |
| JP | 2002-173614 | 6/2002 |
| JP | 2002-302637 | 10/2002 |
| JP | 2002-322389 | 11/2002 |
| JP | 2003-2688 | 1/2003 |
| JP | 2003-49117 | 2/2003 |
| JP | 2003-055002 | 2/2003 |
| JP | 2003-299606 | 10/2003 |
| WO | WO 95/29139 | 11/1995 |

OTHER PUBLICATIONS

Supplementary European Search Report dated Apr. 14, 2009 in counterpart European Patent Application No. 03712984.8-2111 (English language).

Letter from French associate dated Apr. 14, 2009 forwarding the supplementary European Search Report dated Apr. 14, 2009 to Japanese associate (English language). French associate's letter dated Apr. 14, 2009 was date stamped by Japanese associate on Apr. 20, 2009.

Office Action dated May 7, 2008 issued by Japanese Patent Office in connection with corresponding Japanese Patent Application No. 2003-578482.

English Translation of Office Action dated May 7, 2008 issued in connection with Japanese Patent Application No. 2003-578482.

English translation of the claims of JP61-21989 by Saitou et al. (JP61-21989 is already of record), Jan. 30, 1986.

Kasai, Ed. Y., et al., "Semento Konkuri-to You Konwa Zairyou (Materials Mixed With Cement Concrete)," Published by Gijutu Shoin Co., Ltd., (Sep. 30, 1993) with a partial English translation.

* cited by examiner

*Primary Examiner* — Michael Cleveland
*Assistant Examiner* — Alexander Weddle
(74) *Attorney, Agent, or Firm* — Ostrolenk Faber LLP

(57) ABSTRACT

The present invention provides a hydrophilic film, which displays excellent hydrophilicity, and also displays excellent durability with respect to acidic, neutral, and alkaline detergents and chemicals. A hydrophilic film of the present invention comprises a double oxide of silicon and zirconium, an alkali metal, and water. Furthermore, the film may also comprise aluminum or a bivalent metal, and may also contain at least one of a silane coupling agent and an acrylic resin.

5 Claims, No Drawings

HYDROPHILIC FILM, PROCESS FOR PRODUCING SAME, AND COATING MATERIAL FOR FORMING HYDROPHILIC FILM

CROSS REFERENCE TO RELATED APPLICATIONS

This is a continuation of U.S. patent application Ser. No. 10/508,583, now abandoned, filed Sep. 22, 2004, in the name of Keijiro SHIGERU and Daisaku MAEDA and entitled HYDROPHILIC FILM, PROCESS FOR PRODUCING THE SAME, AND COATING MATERIAL FOR FORMING HYDROPHILIC FILM, which was a U.S. national stage of Application No. PCT/JP03/03855, filed on 27 Mar. 2003, which claims priority of that application and on the following applications: Japan, Application No. 2002-089158, filed Mar. 27, 2002, and Japan, Application No. 2002-321172, filed Nov. 5, 2002. The PCT International application was published in the Japanese language.

TECHNICAL FIELD

The present invention relates to a hydrophilic film formed on the surface of a variety of metal, organic or inorganic materials, for the purposes of protecting the material surface and suppressing the adhesion of soiling to the material surface, and relates particularly to a hydrophilic film with superior characteristics, which does not degrade or separate even when washed with detergents.

BACKGROUND ART

Conventional methods for hydrophilizing the surfaces of materials include (1) applying a surfactant, (2) applying a water absorbing resin, (3) applying a hydrophilic photocatalyst, (4) forming either an inorganic coating by enameling or ceramic thermal spraying, or a silica film, and (5) mixing a hydrophilic component with a resin coating agent. For example, Japanese Unexamined Patent Application, First Publication No. 2000-191960 discloses a hydrophilic coating that uses a photocatalyst.

However, films formed by these methods suffer from a number of drawbacks, including poor durability with respect to detergents.

In other words, in the method (1), which involves applying a surfactant, because the surfactant is water soluble, the effect is lost within a short period of time in the presence of water or detergents. In the method (2), which involves applying a water absorbing resin, the resin is acidic, and consequently degrades in the presence of alkaline detergents. In the method (3), which involves applying a hydrophilic photocatalyst, satisfactory effects cannot be achieved in darker locations, and moreover, the silica binder used to fix the photocatalyst is alkaline, and degrades in the presence of neutral detergents. In the method (4), which involves forming an inorganic coating, only heat resistant materials can be treated by enameling or thermal spraying, and the resulting coatings also display poor impact resistance. Furthermore, silica films degrade in the presence of neutral or alkaline detergents. In the method (5), which uses a resin coating agent, the resin degrades in the presence of acidic or alkaline detergents.

The present invention takes the above problems into consideration, with an object of providing a hydrophilic film which displays excellent hydrophilicity, and also displays excellent durability with respect to acidic, neutral, and alkaline detergents and chemicals.

DISCLOSURE OF INVENTION

A hydrophilic film of the present invention either comprises a double oxide of silicon and zirconium, and water, or alternatively, comprises a mixture of oxides of silicon and zirconium, and water, and preferably also comprises an alkali metal. Of the possible configurations, a hydrophilic film comprising a double oxide of silicon and zirconium, water, and an alkali metal is preferred.

In addition, the film preferably also comprises aluminum or a bivalent metal described below. Alternatively, the film may also comprise at least one of a silane coupling agent and a resin.

A hydrophilic film of the present invention can be used for coating all manner of materials, including inorganic materials (such as glass, pottery, porcelain, concrete or stone), metallic materials (such as stainless steel, aluminum, gold, silver, titanium, and any of the various plated metals), and organic materials (such as plastics and fibrous products).

A coating material for forming a hydrophilic film of the present invention comprises a silicon component, a zirconium component, and water. Furthermore, the coating material preferably also comprises an alkali metal component, and preferably also comprises at least one of an aluminum component, a bivalent metal component, a silane coupling agent, and a resin.

A process for producing a hydrophilic of the present invention involves applying an aforementioned coating material for forming a hydrophilic film of the present invention to a substrate, and conducting a hydration reaction.

BEST MODE FOR CARRYING OUT THE INVENTION

A hydrophilic film of the present invention either comprises a double oxide of silicon and zirconium, and water, or alternatively, comprises a mixture of oxides of silicon and zirconium, and water, and preferably also comprises an alkali metal or silver. The term alkali metal refers to lithium (Li), sodium (Na), potassium (K), rubidium (Rb), cesium (Cs) and francium (Fr). Furthermore, in this description, the term water does not refer to simple liquid water, but describes solidified water generated by a hydration reaction, such as crystal water.

A preferred embodiment of a hydrophilic film of the present invention, comprising a double oxide of silicon and zirconium, an alkali metal or silver, and water, is expressed by a chemical formula $M(SiO_m)_x(ZrO_n)_y(H_2O)_z$. In this formula, m and n are arbitrary numbers from 1 to 4, $x+y=1$, and z is an arbitrary number. Furthermore, $M=Li_aNa_bK_cRb_dCs_eFr_fAg_g$ (wherein, a, b, c, d, e, f and g each represent arbitrary numbers, and all of a, b, c, d, e, f and g may be 0). A film of this composition displays excellent durability with respect to various detergents. Furthermore, because the alkali metal ions or silver ions attract water molecules, the film also displays excellent hydration characteristics. This attracted water imparts hydrophilicity to the film. Furthermore, at least one of lithium (Li), sodium (Na) and potassium (K) is preferably used as the alkali metal. By also incorporating silver, antibacterial properties can also be imparted to the film.

Another preferred embodiment of a hydrophilic film of the present invention comprises a mixture of oxides of silicon and zirconium, and water, and this embodiment is expressed by the chemical formulas $M(SiO_m)_x(H_2O)_{z1}$ and $M(ZrO_n)_y$ $(H_2O)_{z2}$, wherein the hydrophilic film is formed from a mixture of these two materials. In these formulas, m and n are arbitrary numbers from 1 to 4, and z1 and z2 are arbitrary numbers. Furthermore, $M=Li_aNa_bK_cRb_dCs_eFr_fAg_g$ (wherein, a, b, c, d, e, f and g each represent arbitrary numbers, and all of a, b, c, d, e, f and g may be 0).

Because a hydrophilic film of the present invention is either a film of a double oxide of silicon and zirconium, or a film of a mixture of oxides of silicon and zirconium, the zirconium strengthens the cross-linking of the silicon, and as a result, the film displays superior durability with respect to acid and alkali, when compared with films of silicon oxide or zirconium oxide, or films formed by simply mixing the two oxides.

The weight proportion within a hydrophilic film of the present invention accounted for by silicon oxide is preferably within a range from 1 to 90%, and even more preferably from 50 to 70%. If the proportion is less than 1%, then adequate hydrophilicity cannot be obtained, whereas if the proportion exceeds 90%, then a satisfactory level of alkali resistance cannot be achieved.

The weight proportion within a hydrophilic film of the present invention accounted for by zirconium oxide is preferably within a range from 1 to 90%, and even more preferably from 20 to 40%. If the proportion is less than 1%, then a satisfactory level of alkali resistance cannot be achieved, whereas if the proportion exceeds 90%, then the hydrophilicity deteriorates.

Furthermore, the weight ratio between the silicon oxide and the zirconium oxide is preferably within a range from 10:1 to 1:10, and even more preferably from 7:2 to 5:4.

The weight proportion within a hydrophilic film of the present invention accounted for by alkali metals or silver is preferably within a range from 0.1 to 10%. If the proportion of alkali metals or silver is less than 0.1%, then the hydrophilicity deteriorates, whereas if the proportion exceeds 10%, the alkali resistance deteriorates.

The weight proportion within a hydrophilic film of the present invention accounted for by water is preferably within a range from 1 to 70%, and even more preferably from 5 to 50%. The water within the film is water that has been bound by a hydration reaction, such as crystal water, and cannot be easily volatilized like liquid water. However, the water need not necessarily be crystallized.

Furthermore, this type of hydration reaction is extremely important in manifesting curing and strength within the film, as is observed in the curing of cement. Furthermore, this water is also an extremely important component in the manifestation of hydrophilicity. If the proportion of water is less than 1%, then the hydrophilicity is unsatisfactory, whereas if the proportion of water exceeds 70%, then an undesirable decrease in film hardness is observed.

Furthermore, a hydrophilic film of the present invention also displays a soap scum adhesion prevention effect, and in those cases where this soap scum adhesion prevention effect is a priority, the weight ratio between the silicon oxide and the zirconium oxide within the hydrophilic film of the present invention is preferably within a range from 7:3 to 3:7. The reason for this requirement is due to the fact that soap molecules comprise both hydrophilic groups and lipophilic groups within the same molecule. In other words, it is thought that when soap acts upon dirt or soiling, organic soiling such as oils adsorb mainly to the lipophilic groups, whereas inorganic materials within sweat and the like adsorb to the hydrophilic groups, and subsequent complex crossing causes insoluble soap scum.

Hence, soap scum has a complex structure, and as a result, is quite different from normal soiling. Because silica is strongly hydrophilic, if the number of hydrophilic groups within the soap scum is low, then the scum will not adhere to the silica. However, if the soap scum contains a large quantity of hydrophilic groups, then the soap scum will bond easily to the surface of the silica. As a result, simply ensuring a strong level of hydrophilicity is not sufficient to adequately prevent the adhesion of soap scum.

On the other hand, although zirconia is an inorganic material, it is strongly lipophilic, and will not adhere very well to the hydrophilic groups within soap scum, meaning that even if the soap scum contains a large quantity of hydrophilic groups, it will not bond to the surface of the zirconia. However, if the soap scum contains a large quantity of lipophilic groups, then these will bond readily, meaning simply ensuring a strong level of lipophilicity is not sufficient to always prevent the adhesion of soap scum.

Accordingly, effective soap scum adhesion prevention can be achieved by mixing silica and zirconia, which display reciprocal properties, and preferably by using either a nano level mixture of alkoxides or a double oxide. A soap scum adhesion prevention effect is exhibited, to some extent, by a film comprising a mixture of a silicon oxide and a zirconium oxide, although if a double oxide of the two elements is formed, or additives such as alkali metals, alkali earth metals, zinc or copper are added to form a hydrate, then the soap scum adhesion prevention effect is enhanced, and provides even better durability.

In addition to the components described above, a hydrophilic film of the present invention may also comprise either aluminum or a bivalent metal. The bivalent metal is preferably selected from amongst the alkali earth metals, namely, Ca, Sr, Ba, Ra, Be and Mg, as well as Zn, Cu(II), Fe(II), Ni(II) and Mn(II). Incorporating this type of metal component improves the strength of the film. It is thought that the reason for this observation is that network structures comprising the aforementioned mixed oxide of silicon and zirconium, alkali metal ions and water can be cross-linked by using these metal additives. Furthermore, the bivalent metal is preferably at least one metal selected from a group consisting of the alkali earth metals, Zn and Cu(II). In the case of Fe, a similar effect can be achieved even with a metal component that is not bivalent.

The weight proportion within a hydrophilic film of the present invention accounted for by aluminum is preferably within a range from 0.1 to 10%. If the weight proportion of aluminum is less than 0.1%, then no differences are discernible from the case in which no aluminum is added, whereas if the weight proportion of aluminum exceeds 10%, the hydrophilicity deteriorates undesirably.

The weight proportion within a hydrophilic film of the present invention accounted for by bivalent metals is preferably within a range from 0.1 to 10%. If the weight proportion of bivalent metals is less than 0.1%, then no differences are discernible from the case in which no such metals are added, whereas if the weight proportion of bivalent metals exceeds 10%, the hardness deteriorates undesirably.

Furthermore, if required, silver may also be added to impart antibacterial properties to the film.

If, in addition to the components described above, at least one of a silane coupling agent and a resin is added, then the adhesion between the film and the coated target surface can be improved. The resin can be any material typically called a resin, and there are no particular restrictions, although acrylic resins are preferred. There are no particular restrictions on the acrylic resin, and any resin typically called an acrylic resin can be used. Suitable examples include polyacrylic acid, which is a polymer of acrylic acid, polymethacrylic acid, which is a polymer of methacrylic acid, as well as polymers of acrylic acid derivatives, polymers of methacrylic acid derivatives, and copolymers of such monomers. It is thought that the reason for the improvement in adhesion is the fact that a polymer such as polyacrylic acid acts effectively in improving the bonding between inorganic components and the coating target surface. In addition to acrylic resins, other resins such as urethane resins, melamine resins, epoxy resins, silicone resins, and fluororesins can also be used. Of these resins, aqueous type resins that are capable of mixing with water are preferred.

The weight proportion within a hydrophilic film of the present invention accounted for by at least one of a silane coupling agent and a resin is preferably within a range from 1 to 10%.

A silane coupling agent is an organic silane compound represented by a general formula $R^1Si(OR)_3$ (wherein $R^1$ is an organic substituent), and preferred examples include trimethoxyphenylsilane, trimethoxymethylsilane, vinyltriethoxysilane, 3-methacryloxypropyltrimethoxysilane, 3-glycidoxypropyltrimethoxysilane, and 3-aminopropyltriethoxysilane. Because a silane coupling agent has the effect of bonding organic resins and inorganic materials, it can be favorably combined with other resin components. The introduction of polyacrylic acid or a copolymer or derivative thereof, or alternatively, itaconic acid or methacrylic acid is ideal. Acrylic acid and methacrylic acid are preferably introduced in the form of water co-soluble derivatives such as acrylic-melamine copolymers, 2-hydroxyethyl methacrylate and glycidyl methacrylate.

The thickness of a hydrophilic film of the present invention is typically within a range from 0.01 to 5 μm, and preferably from 0.1 to 1.0 μm. If the film is thinner than 0.01 μm, then little hydrophilic effect is realized, whereas if the thickness exceeds 5 μm, the film becomes prone to peeling or separation.

Furthermore, in those cases where the soap scum adhesion prevention effect is a priority, the thickness of the hydrophilic film of the present invention is typically within a range from 0.05 to 5 μm, and preferably from 0.1 to 1.0 μm. If the film is thinner than 0.05 μm, then only a minimal soap scum prevention effect is realized, whereas if the thickness exceeds 5 μm, the film becomes prone to peeling or separation.

A hydrophilic film of the present invention helps prevent the adhesion of the type of soiling formed on all manner of materials, and can be used in kitchen products such as sinks, bathroom products, and washing machines and the like.

Particularly when used in washing machines, laundry sinks, wash basins, bath tubs, around drain holes, and on faucet fitting and pipes, the film is able to prevent not only oil-based soiling, but also the adhesion of soap scum.

Next is a description of a process for forming a hydrophilic film of the present invention. This process presents a preferred method of forming a hydrophilic film of the present invention, although the hydrophilic film of the present invention is not restricted to films formed using this process.

A hydrophilic film of the present invention is formed by applying a liquid coating material comprising the various components, and then drying and heating the applied coating. The raw materials for each component are preferably solutions or liquid dispersions.

The silicon raw material is preferably a water soluble salt such as an alkali silicate, a colloidal silica (silica sol), or a silicon alkoxide such as ethyl silicate. In those cases where an alkoxide is used, the alkoxide is preferably first hydrolyzed in the presence of water (acid or alkali) to form a sol, as this yields a more favorable film.

The zirconium raw material is preferably a water soluble salt such as zirconium oxychloride or zirconium oxynitrate, an alkoxide such as zirconium tetrabutoxide or a hydrolysis product thereof, or a zirconia sol.

The alkali metal raw material preferably uses a water soluble salt such as a nitrate, a chloride, or an organic acid salt of the alkali metal. Furthermore, salts such as lithium silicate or lithium zirconate that also contain another component of the hydrophilic film of the present invention are ideal.

The silver raw material preferably uses either a water soluble salt such as silver nitrate or an organic acid salt, or a silver colloid.

The aluminum raw material is preferably a water soluble salt such as aluminum nitrate or chloride, an alkoxide such as aluminum isopropoxide or a hydrolysis product thereof, or an alumina sol.

The bivalent metal raw material is preferably a water soluble salt such as a nitrate or a chloride of the bivalent metal.

The silane coupling agent or resin component is preferably selected from the materials described above, and of these, acrylic resins are particularly preferred. Furthermore, the water component may use the water used in the aqueous solutions of the aforementioned components, the water used in hydrolyzing an alkoxide, or water vapor from the air, or alternatively, additional water may also be added.

Each of these raw materials is weighed in advance to ensure a composition with predetermined proportions of each component. In order to make the coating process easier, the composition is preferably prepared as a coating material using any of a variety of organic solvents. Other than water, suitable organic solvents include those solvents that are miscible with water such as alcohols and ketones. During preparation, in order to prevent precipitation or condensation, either an acid is added to adjust the pH to an appropriate level, or the quantity of water used is adjusted as appropriate. A volatile acid is preferred as the acid. Nitric acid, hydrochloric acid and acetic acid are ideal. If acid is not added, then a hydration reaction can proceed within the coating material, causing the coating material to harden prior to application. At lower pH values, the hydration reaction is extremely slow, meaning this type of hardening prior to application does not occur.

There are no particular restrictions on the solid fraction concentration within the coating material, although values from 0.1 to 10% are preferred.

The respective weight proportions for the silicon component and the zirconium component within the coating material, calculated as oxides, are preferably within a range from 0.1 to 9% for silicon oxide, and from 0.1 to 9% for zirconium oxide. Furthermore, the weight proportion of the alkali metal or silver component is preferably within a range from 0.01 to 1%.

In addition, in those cases where at least one of aluminum, a bivalent metal, a silane coupling agent and a resin is added, the respective weight proportions within the coating material are preferably from 0.01 to 1% for aluminum, from 0.01 to 1% for the bivalent metal, from 0.1 to 1% for the silane coupling agent, and from 0.1 to 1% for the resin. Furthermore, the coating material should contain a sufficient quantity of water for the hydration reaction.

The weight ratio between the silicon component and the zirconium component within the coating material, calculated as oxides, is preferably within a range from 10:1 to 1:10. Furthermore, in order to achieve an even better hydrophilic effect, weight rations from 7:2 to 5:4 are even more desirable.

Furthermore, in those cases where the soap scum adhesion prevention effect is a priority, weight ratios from 7:3 to 3:7 are the most desirable.

Furthermore, the weight proportion of the alkali metal or silver component within the coating material, calculated as an oxide and calculated relative to the combined weight of the silicon component and the zirconium component when calculated as oxides, is preferably within a range from 0.1 to 5% by weight.

Furthermore, the weight proportion of the aluminum component within the coating material, calculated as an oxide and calculated relative to the combined weight of the silicon component and the zirconium component when calculated as oxides, is from 0.1 to 5% by weight.

Furthermore, the weight proportion of the bivalent metal within the coating material, calculated as an oxide and calculated relative to the combined weight of the silicon component and the zirconium component when calculated as oxides, is also preferably from 0.1 to 5% by weight.

A coating material prepared in this manner can be applied and heated to form a film. Suitable application methods include dipping, spraying and brush coating methods, although there are no particular restrictions on the method used. Similarly, there are no particular restrictions on the heating method employed, although heating to a temperature of 100 to 300° C. is preferred as it promotes the volatilization of the acid. As the acid volatilizes, the pH rises, thus accelerating the hydration reaction and promoting curing. Furthermore, the organic solvent also has the effect of terminating the hydration reaction, and because the organic solvent also evaporates during the heating stage, this also accelerates the hydration reaction. Furthermore, in those cases where, for some reason, heating is not possible, leaving the film to stand for an extended period at room temperature will also result in evaporation of the acid and the organic solvent, causing the hydration reaction to proceed, and the curing process to also proceed gradually. In those cases where curing is unsatisfactory, water is preferably applied to the film to supplement the water component. When supplying water in this manner, supplying an aqueous solution containing bivalent or higher inorganic anions is particularly preferred. Specifically, if the coating material is applied, and following drying, an aqueous solution comprising bivalent or higher anions, including sulfur-containing ions such as sulfate ions, silicon-containing ions such as silicate ions, phosphorus-containing ions such as phosphate ions, aluminum-containing ions such as aluminate ions, carbonate ions, zirconium-containing ions such as zirconate ions, or boron-containing ions such as borate ions, is then applied to the film by spraying or the like, the curing of the film can be accelerated. It is thought that this phenomenon occurs because the above types of ions accelerate the hydration reaction, thereby enabling curing to proceed at normal temperatures. When a coating material of the present invention is used on a washing machine or a laundry sink or the like, because the above types of components are incorporated within soaps and detergents, using the device actually causes the curing of the film to be accelerated.

The curing mechanism relies on the hydration reaction, which accelerates with the pH rise that accompanies the evaporation of the volatile acid added to the coating liquid used for forming the film. The progression of this hydration reaction is the principle used in the curing of cement. This reaction causes water to become incorporated within the cured film, thus providing excellent hydrophilicity, and as this reaction proceeds, the mixed oxide is gradually produced. In a normal sol gel reaction, hydrolysis occurs with an acid catalyst, and curing proceeds via a subsequent dehydration condensation reaction, which is very different from the curing reaction of the present invention in terms of the movement of water.

Furthermore, it is thought that the reason that a hydrophilic film of the present invention displays excellent durability with respect to a variety of detergents is the inclusion of zirconium. However, the zirconium component displays poor hydrophilicity, meaning the zirconium component alone is unable to produce a hydrophilic coating. Only by adding a silica component and an alkali metal to the zirconium component, and then promoting hydration and curing by volatilizing the acid, can a highly durable film with excellent hydrophilicity be obtained.

Applying a coating material for forming a hydrophilic film of the present invention to the surface of any of a variety of materials to form a film helps prevent the adhesion of soiling to all manner of materials, and as such, the coating material can be used in kitchen products, bathroom products, and washing machines and the like. Particularly when used in washing machines, laundry sinks, wash basins, bath tubs, around drain holes, and on faucet fitting and pipes, the coating material is able to prevent not only oil-based soiling, but also the adhesion of soap scum. Furthermore, because application of the coating material enables the formation of a hydrophilic film, a film that helps prevent the adhesion of soiling can be formed on the surface of all manner of molded materials.

EXAMPLES

As follows is a more detailed description based on a series of examples, although the present invention is in no way restricted to the examples presented below.

Example 1

Preparation of a Film on a Glass Plate

To 10 g of tetraethoxysilane were added 80 g of ethanol, 9 g of butoxyethanol, and 1 g of a 1% aqueous solution of nitric acid, and the mixture was then heated at 60° C. with stirring for 24 hours to allow the hydrolysis reaction to proceed, yielding a silica sol solution. Next, 1 g of zirconium oxynitrate, 0.1 g of aluminum nitrate, 0.1 g of zinc nitrate, 1 g of lithium nitrate, and 1 g of polyacrylic acid were dissolved in water and the solution was made up to 100 g. 50 g of each of the two solutions were then mixed together, and the pH was adjusted to pH1 using nitric acid, thus yielding a coating material. The solid fraction concentration of this coating material was approximately 5%, and the chemical composition (weight ratios) of this solid fraction on heating to 300° C., determined using wet chemical analytical methods, was $SiO_2$: 58%, $ZrO_2$: 11%, $Al_2O_3$: 0.4%, $ZnO_2$: 0.8%, $Li_2O$: 4%, $H_2O$: 7%, and polyacrylic acid: 19%. The heated product contained 7% water, and because this water had not evaporated even at 300° C., it is thought to represent solidified water of hydration. Furthermore, the results of X-ray diffraction showed no particular crystalline materials, indicating an amorphous mixed oxide. Using a spray gun, the coating material liquid was sprayed onto a glass plate that had been heated to 300° C., and water was then sprayed onto the plate, thus forming a film of a detergent resistant hydrophilic coating with a film thickness of 0.1 μm on the surface of the glass plate.

Example 2

Preparation of a Film on a Stainless Steel Plate

To 10 g of zirconium tetrabutoxide were added 80 g of isopropyl alcohol, 9 g of colloidal silica (a 30% aqueous dispersion), and 1 g of lithium nitrate, and the pH was then adjusted to pH1 using nitric acid, thus yielding a coating material. The solid fraction concentration of this coating material was approximately 6%, and the chemical composition (weight ratios) of this solid fraction on heating to 200° C., determined using wet chemical analytical methods, was $SiO_2$: 40%, $ZrO_2$: 40%, $Li_2O$: 3%, and $H_2O$: 7%. The heated product contained approximately 7% water, and because this water had not evaporated even at 200° C., it is thought to represent solidified water of hydration. Furthermore, the results of X-ray diffraction showed no particular crystalline materials, indicating an amorphous mixed oxide. This coating material liquid was applied to a stainless steel plate using spraying, and was then heated at 200° C. for 10 minutes, thus forming a film of a detergent resistant hydrophilic coating with a film thickness of 0.2 μm.

Example 3

Preparation of a Film on an Acrylic Sheet 8 g of tetraethoxysilane, 1 g of trimethoxyphenylsilane, and 1 g of zirconium tetrabutoxide were dissolved in 45 g of isopropyl alcohol, and 40 g of a 1% aqueous solution of sodium nitrate was then added. An additional 5 g of 2-hydroxyethyl methacrylate was then added, and the pH was adjusted to pH1 using hydrochloric acid, thus yielding a coating material. The solid fraction concentration of this coating material was approximately 8%, and the chemical composition (weight ratios) of this solid fraction on heating to 100° C., determined using wet chemical analytical methods, was $SiO_2$: 23%, $ZrO_2$: 3%, $Na_2O$: 2%, resin components: 50%, and $H_2O$: 22%. The heated product contained 22% water, and because this water had not evaporated even at 100° C., it is thought to represent solidified water of hydration. Furthermore, the results of X-ray diffraction showed no particular crystalline materials, indicating an amorphous mixed oxide. This coating material liquid was applied to an acrylic sheet using a dipping method, and was then heated at 100° C. for 20 minutes, thus forming a film of a detergent resistant coating with a film thickness of 1.0 μm.

Example 4

Hydrophilicity and Detergent Resistance

The contact angles for each of the films prepared in the examples 1 to 3 are shown in Table 1. For reference purposes, the contact angle of the substrate prior to coating is also shown. From these results it is evident that the coating treatment of the present invention is able to markedly increase the hydrophilicity.

TABLE 1

|  | Example 1 | Example 2 | Example 3 |
|---|---|---|---|
| Contact angle following coating | 10° | 20° | 5° |
| Contact angle prior to coating | 50° | 70° | 80° |

Next, films prepared in the examples 1 to 3 were immersed in an acidic detergent (brand name: Sanpol, manufactured by Dainihon Jochugiku Corporation), a neutral detergent (brand name: Mama Lemon, manufactured by Lion Corporation), and an alkaline detergent (brand name: Kitchen Haiter, manufactured by Kao Corporation) for one week, and the variation in contact angle was measured in each case. Prior to measuring the contact angle, the films were washed well with water to remove any residual detergent. From the results in Table 2 it is very clear that each of the films displays excellent detergent resistance.

TABLE 2

|  | Example 1 | Example 2 | Example 3 |
|---|---|---|---|
| Acidic detergent | 10° | 20° | 5° |
| Neutral detergent | 10° | 20° | 5° |
| Alkaline detergent | 10° | 20° | 5° |

Example 5

Application of a Film to a Stainless Steel Washing Machine

The outside of the stainless steel tank of a washing machine was treated with a film of the present invention. In order to prepare the coating material for forming the film, first, 3 g of zirconium butoxide and 3 g of tetraethoxysilane were dissolved in 44 g of isopropyl alcohol. Meanwhile, 0.2 g of lithium silicate and 1 g of silver nitrate were dissolved in 40 g of a 10% aqueous solution of nitric acid, and 8.8 g of butyl cellosolve was then added. The resulting solution was added gradually, with stirring, to the previously prepared isopropyl alcohol solution, thus yielding a coating material.

The weight ratio between silicon and zirconium within the coating material, calculated as oxides, was 1:1. Furthermore, the ratio between the lithium content of the coating material and the combined weight of silicon and zirconium, calculated as the weight of the respective oxides, was 1:20.

This coating material was sprayed onto the outside of the stainless steel tank of the washing machine, was subsequently dried at 200° C. for 20 minutes, and was then cooled with water to complete formation of the film. The thickness of the thus obtained film was 0.2 μm.

The weight ratio between silicon oxide and zirconium oxide within the produced film was 1:1. Furthermore, the ratio between lithium oxide and the combined weight of silicon oxide and zirconium oxide, expressed as a weight ratio, was 1:20.

The washing machine containing this stainless steel tank, and an untreated washing machine were used for a period of 1 year, and the state of soap scum adhesion was then compared by visual inspection. The untreated product displayed marked levels of soap scum adhesion, and black mold was noticeable on one portion of the tank. In contrast, the coated product showed no soap scum adhesion, and no mold was visible.

Example 6

Formation of a Film on a Plated Faucet Fitting

A bathroom chrome-plated faucet fitting was treated with a film of the present invention. In order to prepare the coating material for forming the film, first, 0.5 g of zirconium butoxide was dissolved in 49.5 g of ethanol. Meanwhile, 0.8 g of zirconium oxynitrate and 0.2 g of calcium nitrate were dissolved in 40 g of a 1% aqueous solution of nitric acid, and 9 g of a 10% aqueous dispersion of colloidal silica was then added. The resulting liquid was added gradually, with stirring, to the previously prepared ethanol solution, thus yielding a coating material.

The weight ratio between silicon and zirconium within the coating material, calculated as oxides, was 2:1. Furthermore, the ratio between the calcium content of the coating material and the combined weight of silicon and zirconium, calculated as the weight of the respective oxides, was 1:20.

The polished chrome-plated faucet fitting was immersed in this coating material, and was then lifted out of the coating material at a rate of 1 mm/second to complete the treatment. The faucet fitting was then dried for 1 day at 20° C. and then sprayed with water. This operations was repeated 5 times, thus forming a coating with a thickness of 3 microns.

The weight ratio between silicon oxide and zirconium oxide within the produced film was 2:1. Furthermore, the ratio between calcium oxide and the combined weight of silicon oxide and zirconium oxide, expressed as a weight ratio, was 1:20.

The faucet fitting produced in this manner and an untreated faucet fitting were used in a bathroom, and the state of soap scum adhesion was then compared by visual inspection. After use for 1 month, the untreated product had a noticeable white film of adhered soap scum, whereas on the treated product, almost no such adhesion was visible. After 3 months, the untreated product displayed marked adhesion of soap scum. In contrast, although the treated product also showed some adhesion of soap scum, the level of adhesion was less than that observed for the untreated product. When the two faucet fittings were then wiped with a sponge, almost no soap scum could be removed from the untreated faucet fitting, whereas in the case of the treated faucet fitting, the soap scum was able to be removed with ease. This observation was continued for a further 1 year, and similar results were observed.

This coating was cured at room temperature (25° C.) because the faucet fitting could not be heated. As described above, this film displayed a favorable soap scum adhesion prevention effect. If this film was rubbed strongly with a sponge then some wearing of the film was noticeable, although there were no particular abrasion problems associated with normal everyday use. In these types of situations, where heating is not possible, even curing of the coating at room temperature is able to produce a film which, for normal use, provides a good soap scum adhesion prevention effect.

Example 7

Paint Top Coat

The coating material prepared in the example 3 was applied, by spray coating, to the surface of an aluminum plate that had undergone acrylic melamine coating, and the coating material was then heated at 150° C. for 30 minutes, thus forming a film. The thickness of the thus obtained film was 0.5 µm. When this aluminum plate was then exposed outdoors, a reduction in the types of stains and streaks caused by rain was confirmed. It is thought that this reduction is due to the fact that because the film is hydrophilic, water droplets and streams tend to diffuse, making any soiling less noticeable.

Example 8

Paint Undercoat

The coating material prepared in the example 1 was applied to the surface of a zinc-plated pipe using dip coating, and was then allowed to dry naturally, thus forming a film. When water was then sprayed onto the film and subsequently dried, the adhesiveness of the film increased. When a urethane based paint was applied over the film and baked, a reduction in the number of typical defects such as peeling was confirmed.

Example 9

Defogging Coating

The material prepared in the example 1 was applied to the surface of a mirror using dip coating, and then dried using a dryer, and when water was then sprayed onto the mirror and wiped off with a towel, the film had cured to the extent that it was not removed by the towel. The thickness of the film was 0.5 µm. When this mirror was used in a bathroom, no fogging of the mirror occurred.

Example 10

Antistatic Coating

The coating material prepared in the example 3 was applied to the surface of a polycarbonate sheet using spray coating, and was allowed to dry naturally, and when water was then sprayed onto the sheet and also allowed to dry naturally, the film had cured to the extent that it was not removed by wiping with a towel. The surface resistivity of polycarbonate is at least $10^{14}\Omega$, but this value decreased to $10^{11}\Omega$ with the coating treatment of the present invention. Accordingly, this treatment enabled a reduction in the electrostatic chargeability of the polycarbonate surface, and dust was less likely to adhere to the treated surface.

Example 11

Scorch Resistant Coating

When a lighted cigarette was pressed against the treated polycarbonate sheet prepared in the example 10, it was confirmed that the surface was more resistant to scorching. It is thought that this finding is because the water of hydration within the coating prevents large increases in the temperature. With a normal untreated polycarbonate, scorching occurs readily with a lighted cigarette.

Example 12

Drying Promoting Coating

The coating material prepared in the example 2 was applied, by spray coating, to the surface of the stainless steel drum of a clothes dryer, and was then heated at 200° C., thus forming a film of thickness 0.4 µm. When the dryer was put to actual use, the drying time for the surface of the stainless steel drum fell to approximately half that of an untreated drum.

Example 13

Scratch Prevention Coating

When the surface of the stainless steel tank from the example 12 was inspected for scratches, it was clear that the quantity of scratches within the coated portion of the drum had been markedly reduced.

Example 14

The coating material prepared in the example 2 was applied to a stainless steel plate using spray coating, and was then dried at room temperature for 24 hours without any heating. An aqueous solution of sodium silicate was then sprayed onto the film surface, and subsequently dried at room temperature for 24 hours, thus forming a hydrophilic film. Furthermore, the coating material prepared in the example 2 was also applied to another stainless steel plate using spray coating, was then dried at room temperature for 24 hours without any heating, and water was then sprayed onto the film surface, and subsequently dried at room temperature for 24 hours, thus forming another hydrophilic film. Even when both films were rubbed lightly with a sponge, no film separation was observed, and particularly in the case of the film that was produced using the aqueous solution of sodium silicate, no separation was observed even when the film was rubbed strongly with the sponge.

INDUSTRIAL APPLICABILITY

The present invention enables the production of a hydrophilic coating film with excellent detergent resistance. This film can be used for treating metallic materials, inorganic materials and organic materials, and not only does the film improve the ease with which soiling can be removed, but it also dries quickly. This enables both water and energy to be conserved, making it an ideal environmentally friendly product. In addition, this coating also displays excellent durability with respect to acidic, neutral, and alkaline detergents, which can be used in the case of excessive soiling. Accordingly, films of the present invention can be potentially applied to a wide range of different applications. Films of the present invention can also be cleaned effectively even with reduced quantities of these detergents, meaning the invention is also environmentally friendly in terms of reduced detergent use.

The invention claimed is:

1. A process for producing a hydrophilic film consisting of the steps of:
    (1) applying, to a substrate, a coating material forming a hydrophilic film, said material comprising a silicon component, a zirconium component, a water-miscible organic solvent and/or an acid, and water, until a coating with a desired thickness is obtained;
    (2) conducting a hydration reaction to cure the coating material, thereby forming a film on the substrate;
    (3) applying, after step (2), an aqueous solution consisting of a silicon-containing ion, a counter ion of the silicon-containing ion, and water to the film; and
    (4) drying the film.

2. A process for producing a hydrophilic film according to claim 1, wherein said silicon-containing ion is a silicate ion.

3. A process for producing a hydrophilic film according to claim 1, wherein said silicon component in said coating material is selected from the group consisting of silica sol and silicon alkoxide.

4. A process for producing a hydrophilic film according to claim 1, wherein the solution used in step 3 is an aqueous solution consisting of sodium silicate and water.

5. A process for producing a hydrophilic film according to claim 1, wherein said counter ion of the silicon-containing ion is a sodium ion.

* * * * *